May 2, 1939.  F. E. DUNNAM ET AL  2,156,753
NONREMOVABLE ILLUMINATED LICENSE PLATE FOR MOTOR VEHICLES
Filed May 27, 1935
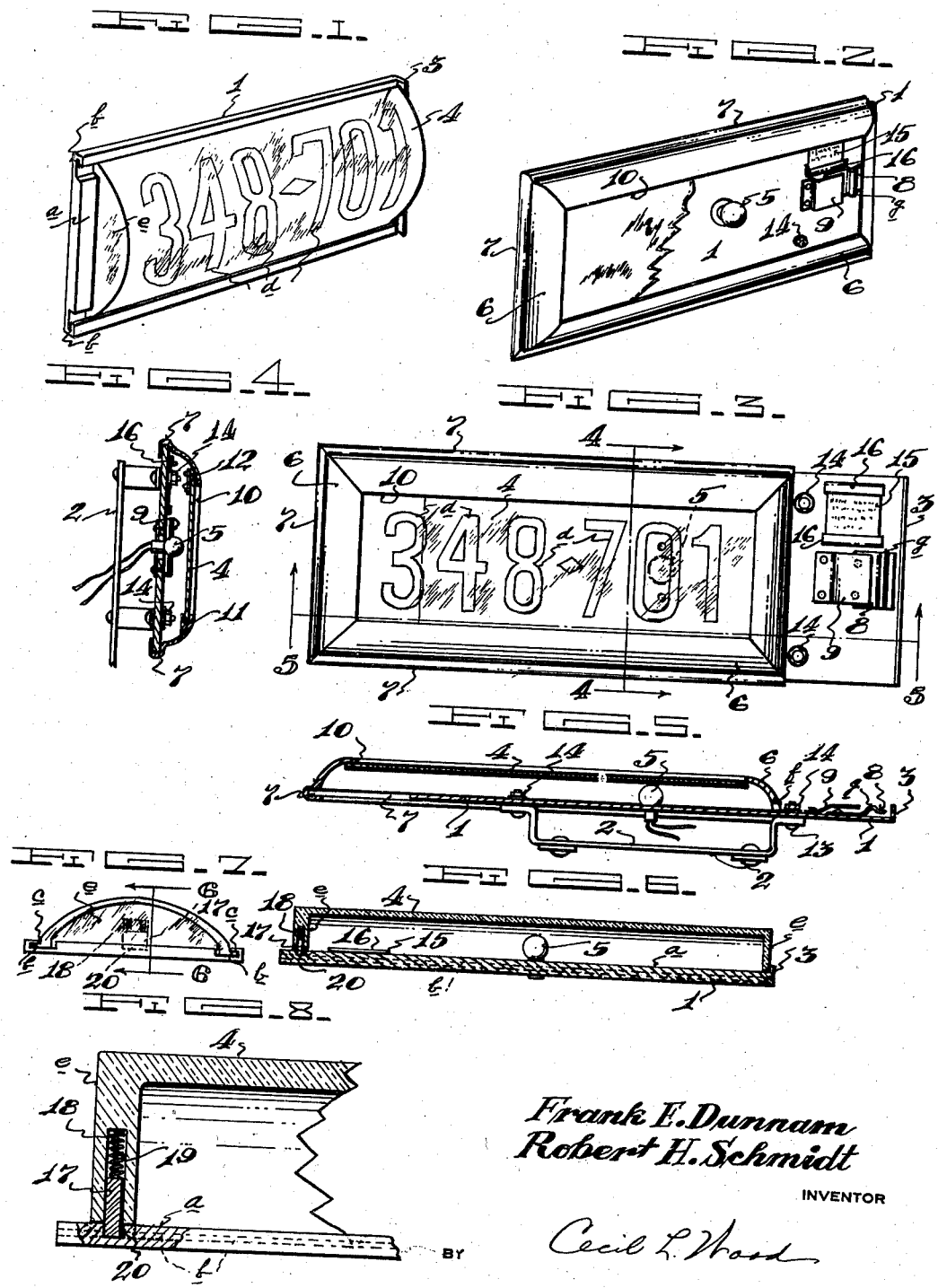
Frank E. Dunnam
Robert H. Schmidt
INVENTOR
BY Cecil L. Wood
ATTORNEY Patented May 2, 1939

2,156,753

UNITED STATES PATENT OFFICE 2,156,753

NONREMOVABLE ILLUMINATED LICENSE PLATE FOR MOTOR VEHICLES

Frank E. Dunnam and Robert H. Schmidt, Fort Worth, Tex., assignors of one-third to R. L. Dewees, Tarrant County, Tex.

Application May 27, 1935, Serial No. 23,734

1 Claim. (Cl. 40—125)

This invention relates to identification or licensing of motor vehicles on the highways. It has particular reference to license plates which are usually issued to motorists to display on their motor vehicles in conformity to State laws, now effective, for taxation purposes as well as identification of the vehicle and its ownership. And its principal object is to provide such identification indicia which is in the general form of the Congressional type of license plates for motor vehicles, yet of a character incapable of being transferred from one vehicle to another for the purpose of fraud or theft.

Another object of the invention resides in the provision of a device preferably constructed of a material, bearing the proper indicia, or license number of the vehicle, of a transparent or translucent character through which medium the license number, as well as the name of the State issuing the license and the date thereof, can be plainly discerned at night when a light is mounted behind the number or other indicia.

Still another object of the invention is to afford a medium through which motor vehicles can be properly identified, as to ownership and other data, which is situated within an inaccessible compartment which can be utilized in emergencies, such as in the case of theft or unlawful transfer, and which identification and other data is issued by any person authorized to issue license plates or identifications for motor vehicles in the various States, such identifying matter capable of being issued in duplicate to enable the operator of the vehicle to keep in his possession a copy of the same data which is mounted within the inaccessible compartment before mentioned.

Yet another object is manifest in the provision of a license plate of the character described which is capable of bearing indicia or data of a conventional character, such as that used on motor vehicles in all of the States, although incapable of being moved from the vehicle to be utilized to another vehicle or otherwise tampered with without destroying the number or other data thereon, which is painted, etched, steamed or engraved upon a plate of transparent or translucent and preferably refractory material mounted in a housing or frame of metal, or the like, whose interior cannot be reached or tampered with without first breaking the plate upon which the data is so fixed.

Broadly, the invention seeks to comprehend the provision of a license plate for motor vehicles, carrying certain data and information required by State and Federal laws of the United States, which plates are so constructed as to afford protection of the vehicle bearing the said license plates from theft, or the like, yet affording the means whereby proper identification of ownership, or other data, at any time, by police or other authorized individuals can be made.

While the foregoing objects are paramount other and lesser objects will become manifest as the description proceeds taken in connection with the appended drawing, wherein:

Figure 1 is a perspective view of one form of the license plate which is a part of the herein described invention, illustrating the manner in which the proper indicia is placed upon a convex surface, of glass or similar material.

Figure 2 shows another form of the invention in which a frame of metal, or the like, is afforded and which is capable of carrying a plate for the license number or other data, which frame or case is constructed of metal or any suitable material.

Figure 3 is a front elevational view of the form shown in Figure 2 showing the casing bearing the license plate is partially removed from the back plate.

Figure 4 is a cross sectional view taken on lines 4—4 of Figure 3.

Figure 5 is a longitudinal cross section of the form shown in Figures 2 and 3 taken on lines 5—5 of Figure 3.

Figure 6 is a longitudinal cross sectional view of the form shown in Figure 1 taken on lines 6—6 of Figure 7 and illustrates the convex indicia bearing member of glass, or the like.

Figure 7 is an end view of the structure shown in Figure 1, and

Figure 8 is a fragmentary enlarged cross sectional portion of that form of the invention shown in Figures 1, 6 and 7 and illustrating the locking medium for the device.

Under the present system of issuing license plates for motor vehicles, thieves and unscrupulous dealers have been found guilty of interchanging license numbers between motor vehicles, that is to say, in order to hide the identity of a motor vehicle or to defraud the owner or prospective owner with respect to the said motor vehicle by the exchange of identifying plates. Certain novel and salient features of the device will become manifest presently.

Accordingly, therefore, the invention consists primarily in a plate 1 which is capable of being secured to the front or rear of a motor vehicle by means of brackets 2, or the like. In the form illustrated in Figure 1, the plate 1 is provided at one end with the stop arrangement 3 against which the indicia or number bearing plate 4 is adapted to stop when projected onto the plate 1 at $a$ and held in position thereon by grooves $b$ arranged on each side thereof which engage the outwardly extending longitudinal flanges $c$ which are integral with the plate 4.

The plate 4, as will be seen by reference to Figures 6, 7 and 8, is preferably constructed of glass, or other refractory material, and is preferably of a transparent or translucent character for a reason which will be presently mentioned. The plate 4, being convex and of a semi-circular form, is hollow inside and therefore affords a chamber within which can be situated a light bulb 5 which is capable of producing sufficient light to illuminate the back of the plate 4 and thereby enable persons to easily read the data placed thereon, such as that shown at d. The plate 1 may define a semi-cylinder having both of its ends e constructed of the same material as the body of the plate 4 although the said ends e may be of a different material, such as metal, or the like.

Referring now to Figure 2, attention is directed to a frame-like structure 6 which is also provided with a plate 1, which latter is secured by brackets 2 to a motor vehicle, as previously described. The frame 6 is formed in such a manner as to provide a slot arrangement 7 on three of its sides which arrangement is shown more in detail in Figures 4 and 5, the said slots 7 being capable of slidably receiving the plate 1, previously mentioned. The frame 1, carrying the said slots 7, is shown in Figure 3 as being operatively and normally positioned upon plate 1. This is true also of Figure 5 which, as previously stated, is a longitudinal cross section of Figure 3.

The plate 1 utilized in connection with the form of this invention illustrated in Figures 2, 3, 4 and 5, is also provided with a stop 3 which consists in the up-turned end of the plate 1, as will be seen by reference to Figure 5. Near the stop 3 is situated a preferably flat spring 8 which will be depressed when the end f of the frame 6 passes thereover and will therefore lock the frame 6 in position on the plate 1 and prevent its being removed therefrom until said spring 8 is again depressed. The spring 8 is preferably provided with a small curvature g which serves to hold the end f of the frame 6 against movement. The spring 8 is provided with a guard 9 which will serve to prevent its being tampered with by a small tool or instrument, such as a wire, or the like, to dislodge or unlock the frame 6 and thus enable any unauthorized person to remove the license plate 4 which, as has been stated, is preferably of a refractory material.

The plate 4 is preferably secured within the opening 10 of the frame 6 by a groove 11 which is arranged along the lowermost interior edge of the opening 10, and which is capable of receiving the lowermost edge of the plate 4, as shown in Figure 4, while the uppermost edge of the plate 4 is retained in position by a small latch 12, such as a washer or strip of metal or the like. Since the plate 1 is secured to the brackets 2 preferably by means of round-headed bolts 13 which are provided with lockwashers and nuts 14, the latter being situated within the frame 6 when in normal position, it is impossible to remove the frame 6 without first breaking or mutilating the plate 4 inasmuch as the frame 6 is locked by the spring 8 on the plate 1 thereby rendering the interior of the frame 6 inaccessible. When it is desired to change license plates, the old plate 4 can be broken by any instrument, the spring 8 depressed and the frame 6 drawn off of the plate 1, whereupon a new plate 4 can be positioned in the opening 10 thereof and the assembly replaced on the plate 1 and again urged to the stop 3 whereupon the spring 8 will lock the same in position.

An identification card 15 is provided which can be secured to the inner face of the plate 1 by keepers 16 which are fastened to the plate 1 in the manner shown in Figures 2 and 3, and such identification card may recite the name of the owner of the vehicle, his address, make and model of the vehicle and other necessary data. A duplicate of the identification card 15 may also be issued at the same time to enable the owner or operator of the vehicle to keep on his person at all times a copy of the identification card 15 always remaining on the plate 1 within the frame 6 and behind the plate 4, as previously described.

Referring to Figures 6, 7 and 8, it is pointed out that the plate 4 is provided with a lock arrangement 17 in one end thereof which is actuated by a small spring 18. The locking device 17, shown in detail in Figure 8, is disposed within a recess 19 in one of the vertical ends e of the convex plate 4 the latter having already been described. When it is desired to change the number of the vehicle, or other data thereon, a new plate may be adjusted to the stationary plate 1 by causing the laterally extending flanges c to engage the grooves b on each side of the plate 1, sliding the plate 4 onto the plate 1 until one end thereof reaches the stop 3 whereupon the locking arrangement 17 will, by reason of the spring 18, drop into a slot or recess 20 which will retain the member 4 in position on the plate 1 unless broken, or otherwise mutilated. The plate can also be attached to the bracket 2.

The form of the invention just described, that is to say, that shown in Figures 1, 6, 7, and 8, is also provided with an identification card or plate 15 and is retained on the plate 1 by keepers 16, previously described.

It is not intended that the invention herein described be limited to its attachment to any particular type of bracket or supporting medium 2 since there are innumerable types of supporting mediums for license plates, or the like, and the structure illustrated is merely for the purpose of indicating in what manner the assembly can be attached to the conventional motor vehicle. The primary purpose of the invention, as has been already stated, is that of preventing theft or mutilation of the identification of a vehicle to which the apparatus is attached.

It is understood that certain changes and modifications may be resorted to from time to time by those skilled in the art, such changes and modifications however as may be considered within the spirit and intent of the invention may also be considered as coming within the scope of the appended claim.

What is claimed is:

In a license plate for motor vehicles, the combination of a rectangular supporting plate, a rectangular frame having an opening in the face thereof, slots in three edges of the said rectangular frame for slidable engagement with three edges of the said supporting plate, a transparent indicia bearing plate covering the said opening, a tension spring mounted on the first named plate for engagement with the inner side of the said frame, and a spring guard positioned over the said spring.

FRANK E. DUNNAM.
ROBERT H. SCHMIDT.